US008895134B2

(12) United States Patent
Daeubler et al.

(10) Patent No.: US 8,895,134 B2

(45) Date of Patent: Nov. 25, 2014

(54) APPARATUS AND METHOD FOR COATING A COMPRESSOR HOUSING

(75) Inventors: Manfred Daeubler, Dachau (DE); Renate Mendritzki, legal representative, Gelsenkirchen (DE); Horst Mueller-Wittek, legal representative, Gelsenkirchen (DE); Wilfried Smarsly, Munich (DE)

(73) Assignee: MTU Aero Engines GmbH, Munich (DE)

( * ) Notice: Subject to any disclaimer, the term of this patent is extended or adjusted under 35 U.S.C. 154(b) by 1678 days.

(21) Appl. No.: 11/631,032

(22) PCT Filed: Apr. 29, 2005

(86) PCT No.: PCT/DE2005/000789

§ 371 (c)(1),
(2), (4) Date: Oct. 7, 2008

(87) PCT Pub. No.: WO2006/000174

PCT Pub. Date: Jan. 5, 2006

(65) Prior Publication Data

US 2009/0214824 A1 Aug. 27, 2009

(51) Int. Cl.

| | |
|---|---|
| ***B32B 3/30*** | (2006.01) |
| ***F02K 3/00*** | (2006.01) |
| ***F02C 1/00*** | (2006.01) |
| ***F01D 11/12*** | (2006.01) |

(52) U.S. Cl.

CPC ............ *F01D 11/125* (2013.01); *F01D 11/122* (2013.01); *F05D 2300/614* (2013.01)

USPC ........ 428/161; 428/163; 428/172; 415/174.4; 60/226.1; 60/722; 60/805; 418/77

(58) Field of Classification Search

USPC ............ 428/161, 163, 164, 167, 172; 51/295; 415/170.1–174.4; 277/53, 227; 60/805; 418/77

See application file for complete search history.

(56) References Cited

U.S. PATENT DOCUMENTS

| | | | | |
|---|---|---|---|---|
| 4,405,284 | A | 9/1983 | Albrecht et al. | |
| 4,422,648 | A | 12/1983 | Eaton et al. | |
| 4,536,127 | A | 8/1985 | Rossmann et al. | |
| 4,573,872 | A * | 3/1986 | Nakata | 416/96 A |
| 5,064,727 | A * | 11/1991 | Naik et al. | 428/593 |
| 5,562,745 | A * | 10/1996 | Gagliardi et al. | 51/298 |
| 5,562,998 | A * | 10/1996 | Strangman | 428/612 |
| 5,585,155 | A * | 12/1996 | Heikkila et al. | 428/36.7 |
| 6,703,137 | B2 * | 3/2004 | Subramanian | 428/469 |
| 6,716,539 | B2 * | 4/2004 | Subramanian | 428/621 |
| 2004/0012152 | A1 * | 1/2004 | Grunke et al. | 277/415 |

FOREIGN PATENT DOCUMENTS

| | | | |
|---|---|---|---|
| EP | 0 765 951 | A2 | 4/1997 |
| EP | 0 965 730 | A2 | 12/1999 |
| EP | 1 375 696 | A2 | 1/2004 |

OTHER PUBLICATIONS

PCT/DE2005/000789 PCT/ISA/210.

* cited by examiner

*Primary Examiner* — Donald J Loney

(74) *Attorney, Agent, or Firm* — Crowell & Moring LLP

(57) ABSTRACT

A running-in coating for a compressor housing is disclosed. The running-in coating has at least two layers where a first layer is dimensionally stable and at least one additional layer has run-in capability.

10 Claims, 3 Drawing Sheets

APPARATUS AND METHOD FOR COATING A COMPRESSOR HOUSING

BACKGROUND AND SUMMARY OF THE INVENTION

This application claims the priority of International Application No. PCT/DE2005/000789, filed Apr. 29, 2005, and German Patent Document No. 10 2004 031 255.9, filed Jun. 29, 2004, the disclosures of which are expressly incorporated by reference herein.

The present invention relates to a running-in coating.

An important factor in aircraft engines and gas turbines which affects the efficiency and the reliability of the system is maintaining clearance between a rotor and a stator. Maintaining this clearance between a compressor rotor, particularly a high-pressure compressor rotor, and the compressor housing proves to be particularly difficult. In the case of the compressor blades, unlike the turbine, shrouds have to be dispensed with. In addition, efforts are continually being made to reduce the number of blades and stages in integral construction to minimize manufacturing and maintenance costs. The result of this—cancelling out any gain—is higher rotor speed and rotor tip velocities and thus a greater load.

A degeneration, i.e., an increase in the clearance between the rotor and the compressor housing, affects both the efficiency and the surge line of the compressor with increasing operating time. However, the compressor must be designed for all operating time points and be able to generate satisfactory efficiency in all operating ranges without damage to individual components.

This is particularly problematic since the rotor cannot be prevented from rubbing against the stator because of centrifugal force and thermal expansion of the rotor and because of assembly tolerances and rotor and housing eccentricities.

When maintaining a clearance, a minimum clearance must be achievable at stationary full power and at high part load. Furthermore, the clearance must be so small while accelerating the cold engine that at full power the rotor is just running in. At all other operating points, as for example, renewed acceleration of a hot engine, running in of the rotor must be prevented.

To prevent damage to the blade tips, which unlike the turbine are not protected by a shroud, the blade tips are usually provided with a hard abrasive coating. Alternatively or in addition, the housing can be coated with running-in coatings to prevent blade tip wear when setting minimal radial clearance. Running-in coatings have the particular advantage that when material is removed because of the contact with the blade tips, the coatings do not cause an increase in clearance over the entire circumference and result in only a minor loss of power for the engine.

It is furthermore known that surging can occur in compressors if the airflow through the compressor is disturbed and a complete stalling of pumping action in the entire compressor results.

A compressor must, therefore, be designed such that a good safety margin exists between the surge line, that is to say the condition in which surge oscillations occur under the prevailing air flow rate and pressure ratio values, and the working line, that is to say the air flow rate and pressure ratio values at which the compressor is normally operated. It is therefore necessary to control the flow rate in such a way that the engine can be operated efficiently over a wide speed range, particularly with low loss of efficiency, and the margin to the surge line can be maintained. To achieve this objective, casing treatment can be used. In this process, the compressor housing is provided with slots which usually run at an angle with reference to the axis of rotation of the rotor and are provided in the area of at least one ring of blades on the inside of the housing.

The distribution of the slots and their geometry affect the surge line margin and the efficiency of the compressor. Since the aforementioned running-in coating is to be provided in the area of the compressor housing in which these slots are provided, that is to say in the area of the rotor, the distribution and geometry of these slots is additionally determined by the composition of the running-in coating.

The object of the present invention is to create a running-in coating which permits flexible design of the compressor housing, particularly a specific casing treatment. This object is achieved in accordance with the invention by a running-in coating for a compressor housing which has at least two layers, wherein a first layer is dimensionally stable and at least one additional layer has run-in capability.

The coating, specifically a seal, is designated here as a running-in coating which is preferably applied to the inside of the compressor housing. This running-in coating can be limited to the area of the individual rotors, but can also extend beyond this area, specifically cover, or line, the entire compressor housing. The running-in coating in accordance with the invention comprises not just the uppermost layer of a coating for the compressor housing alone but all the layers which are applied to a base material of the compressor housing.

Through the combination of the at least two layers named, that is the layers with run-in capability and the dimensionally stable layer, flexible design and layout for the compressor housing is possible. Specifically, the properties of the different materials and different geometries can be ideally combined through the different layers.

The first dimensionally stable layer preferably consists of a material having high dimensional stability. Both woven materials, fibers or felts as well as porous or solid materials can be used. The first layer can, for example, be manufactured from hollow titanium spheres or constitute a ring of a fibrous weave.

In accordance with the invention, at least one additional layer consists of a material capable with run-in capability. This additional layer preferably constitutes the second layer which adjoins the first layer. By providing a material with run-in capability, the running-in coating in accordance with the invention is endowed with the property that is required to ensure clearance between the rotor and the stator under different operating conditions. At the same time, by providing a material with run-in capability, damage to the dimensionally stable material of the first layer and the rotors, particularly the compressor blades, can be avoided. Materials with fillers, such as hollow spheres for example, can be used In accordance with the invention, at least one of the layers of the run-in coating can be profiled. Profiling creates a geometry advantageous to airflow and the thermal properties of the running-in coating can also be positively affected.

In accordance with one embodiment, the first dimensionally stable layer is profiled. Through this configuration of the first layer, that is, by this layer having different thicknesses, a profile for the entire running-in coating can be specified. The first layer preferably has a smooth side for this, where a side is designated as smooth which has neither recesses nor elevations. This smooth side faces the inside of the compressor housing and can be attached indirectly or directly thereto.

It is preferred that at least one additional layer with run-in capability is provided which has a uniform thickness. Preferably it lies directly against the first profiled layer. This second layer constitutes therefore an encasement of the profile formed by the first layer. The second layer is provided on the side of the first layer on which the latter has elevations and/or recesses, that is, on the side facing away from the inner wall of the compressor housing. The particular advantage of applying a uniform layer is the simplification of the manufacture of the running-in coating. In accordance with the invention, it is also possible to apply a second layer with different thicknesses onto the first layer. For example, the second layer can have a greater thickness in those locations at which elevations are provided in the first layer. A second layer can be dispensed with entirely where the recesses are located in the profile of the first layer, as required. In this case, the second layer is not continuous.

The profile formed by the first layer can be preserved reliably even under mechanical load through the selection of the material for the first layer, as for example, hollow titanium spheres or another dimensionally stable material.

In accordance with a preferred embodiment which is particularly suitable for casing treatment, the running-in coating in accordance with the invention is designed such that it has grooves on one side at least partially, where they can be formed by recesses in the first layer. The grooves can lie at an angle to the rotor axis in the installed position or be aligned axially.

As a result of this design, the shape of the entire running-in coating is determined essentially by the shape, or the profile, of the first layer. Specifically, if this layer has been produced from dimensionally stable material, it can be ensured that the profile will retain its shape. In the case of the running-in coating in accordance with the invention, the grooves can be used optimally to affect airflow behavior and to adjust different pressure ratios. The grooves can thus be used as a means for the casing treatment.

The geometry of the grooves can be designed flexibly in the case of the running-in coating according to the invention. In accordance with the invention, it is possible to design the grooves such that they have great depth in comparison to their breadth. In particular, ratios of the width of the grooves to their depth can be adjusted to a maximum of 0.5, preferably a maximum of 0.3.

These low ratios of profile width to profile depth cannot be realized with conventional running-in coatings consisting exclusively of material with run-in capability because there is no dimensional stability with these running-in coatings. In accordance with the invention, enlarging the profile depth, or the groove depth, confers advantages. In particular, an increase in the surge line margin can be achieved. Further, the ratio of surface to groove on the surface of the running-in coating is also significant for the surge line margin. The provision of a large number of grooves over the circumference of the compressor housing can be realized with the running-in coating in accordance with the invention.

Further, a low ratio of width to depth for the grooves can be advantageous in order to guarantee sufficient depth for the groove following abrasion of a specific amount of the running-in material. The abraded material can be retained in the grooves and adequate groove depth can still be ensured.

In accordance with a preferred embodiment, the second layer surrounds the first layer completely. This means that the second layer is provided on both the profiled side of the first layer and on the smooth side of the first layer. In this case, the first layer acts as a core and is encased by the second layer. This embodiment has advantages particularly with regard to the manufacturing method. In this instance, the encasement is preferably continuous, that is, it also covers the ends of the core. It is also possible to provide two separate second layers on the opposite sides of the first layer. Different materials can be used for the separate layers. The layer facing away from the compressor housing must have run-in capability.

The embodiments in which the first dimensionally stable layer of the running-in coating is profiled are designated as macro-profiled running-in coatings in what follows. They can be employed particularly in the low-pressure compressor of a compressor, particularly a compressor for an airplane engine or a gas turbine.

Alternatively, the running-in coatings in accordance with the invention according to a further embodiment can have a structure in which the at least one additional layer with run-in capability is profiled.

In these embodiments the first dimensionally stable layer can have a uniform thickness, that is, not have any profiling.

In accordance with one embodiment, the at least one additional layer with run-in capability can be micro-profiled on at least the side facing away from the first layer. This is the side of the running-in coating on which the running-in coating is exposed to mechanical and thermal loads. The micro-profiling can be created for example by a film with an uneven, specifically unhardened or bladed surface, for example an imbricated surface. The scales are preferably aligned, where the alignment is optimized in accordance with airflow considerations. The film is preferably applied to an additional layer with run-in capability which consists of a material with run-in capability.

A running-in coating with micro-profiling can be used at higher temperatures in comparison to a macro-profiled running-in coating. So the micro-profiled running-in coating suggests itself for example for the high-pressure compressor, while the running-in coating with macro-profiling can be used for the housing of the low-pressure compressor.

In accordance with a further embodiment of the micro-profiled running-in coating, the layer with run-in capability which can be coated with a film with run-in capability, can consist of a fibrous material with aligned fibers, where the alignment of the fibers is preferably selected to be optimized for airflow.

Both in the embodiment of the running-in coating as a macro-profiled coating and in the embodiment as a micro-profiled coating, the layer with run-in capability can consist of a material with run-in capability or be coated with a material with run-in capability.

Fibrous or porous material can be used, for example, as the material for the layer with run-in capability.

In accordance with the invention, fibrous, porous but also solid material can be considered as material for the first, dimensionally stable layer.

In accordance with one embodiment, the first, dimensionally stable and/or the at least one additional layer with run-in capability can be provided with reinforcing means, specifically be permeated therewith. They can specifically constitute spheres. For the layer with run-in capability, spheres of unhardened material suggest themselves which can for example be contained in a layer of aligned fibers.

BRIEF DESCRIPTION OF THE DRAWINGS

The invention is described more fully in what follows with reference to the appended drawings, wherein.

DETAILED DESCRIPTION OF THE DRAWINGS

Figure 1:
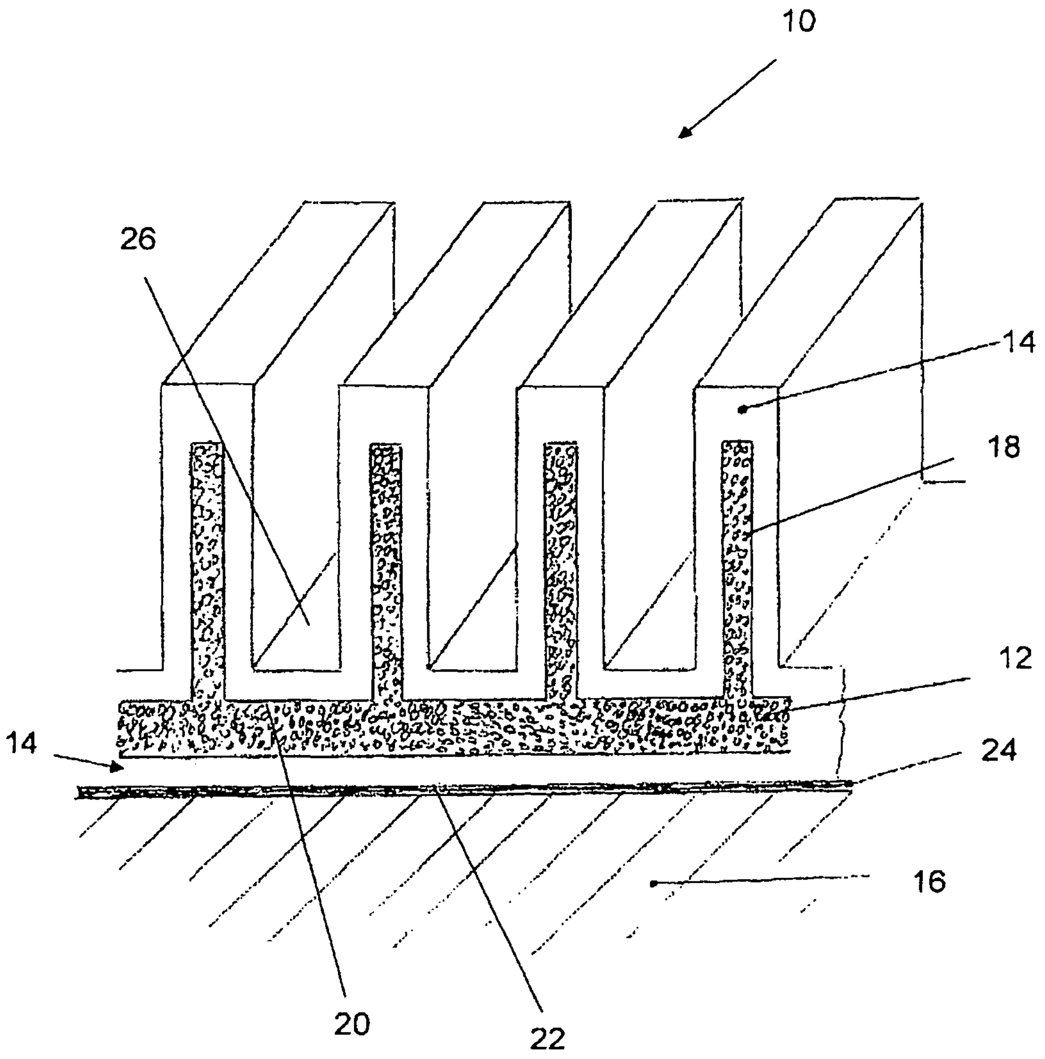
FIG. 1 shows a perspective cutaway view of an embodiment of the running-in coating in accordance with the invention with a macro-profile.

A running-in coating 10 is shown in FIG. 1 which comprises a first layer 12 and a second layer 14. This running-in coating 10 is applied to a base material 16 of a compressor housing.

The first layer 12 in the embodiment shown has a profile in which a number of webs 18 are provided, between which recesses 20 are formed in the first layer 12. The webs 18 can be applied to the layer 12 or the recesses 20 can be introduced into the layer 12. The recesses 20, or the webs 18, can preferably be created during manufacture of the layer 12 by non metal-removing processes, e.g., casting or pressing.

In the embodiment shown, a second layer 14 which has a uniform thickness surrounds the profile of the first layer. The profile of the first layer 12, which forms the core of the running-in layer 10, and especially its webs 18 are encased by the layer 14. The smooth side 22 of the first layer 12 facing away from the webs 18 is similarly covered by the second layer 14. In this area of the second layer 14, the running-in coating 10 is conjoined by a connecting zone 24 to the base material 16. The attachment of the running-in coating 10 to the base material 16 can be carried out by traditional methods, such as for example, welding or bonding.

As can be seen from FIG. 1, the depth of the grooves 26 which are formed by the recesses 20 and the encasement formed by the layer 14, is great in proportion to the width of the grooves 26. This shape can be implemented in the case of the running-in coating 10 in accordance with the invention because of the dimensionally stable core.

In FIG. 1, only one part of the running-in coating 10 is shown. In accordance with the invention, this can constitute a ring which can be installed into the compressor housing.

Figure 2:
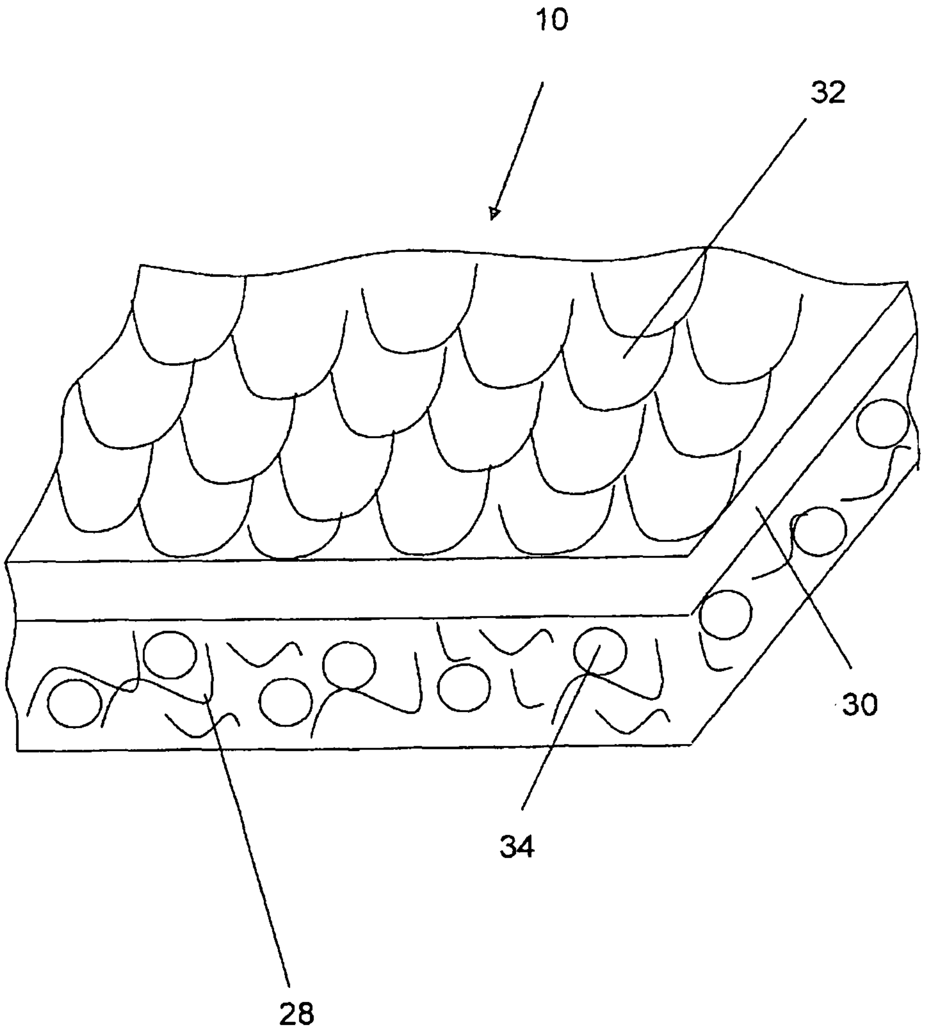
FIG. 2 shows a perspective cutaway view of an embodiment of the running-in coating in accordance with the invention with a micro-profile.

In FIG. 2, a micro-profiled running-in coating is shown which consists of a first dimensionally stable layer 28 which has a constant thickness and of a layer with run-in capability 30. A profile 32 is imparted to this primary running-in layer 30. The profile 32 has an imbricated structure, wherein the profile 32 is designed for optimal airflow. The dimensionally stable first layer 28 in this embodiment is made of a felt, that is, a fiber layer with non-aligned fibers and can be permeated with spheres 34.

Figure 3:
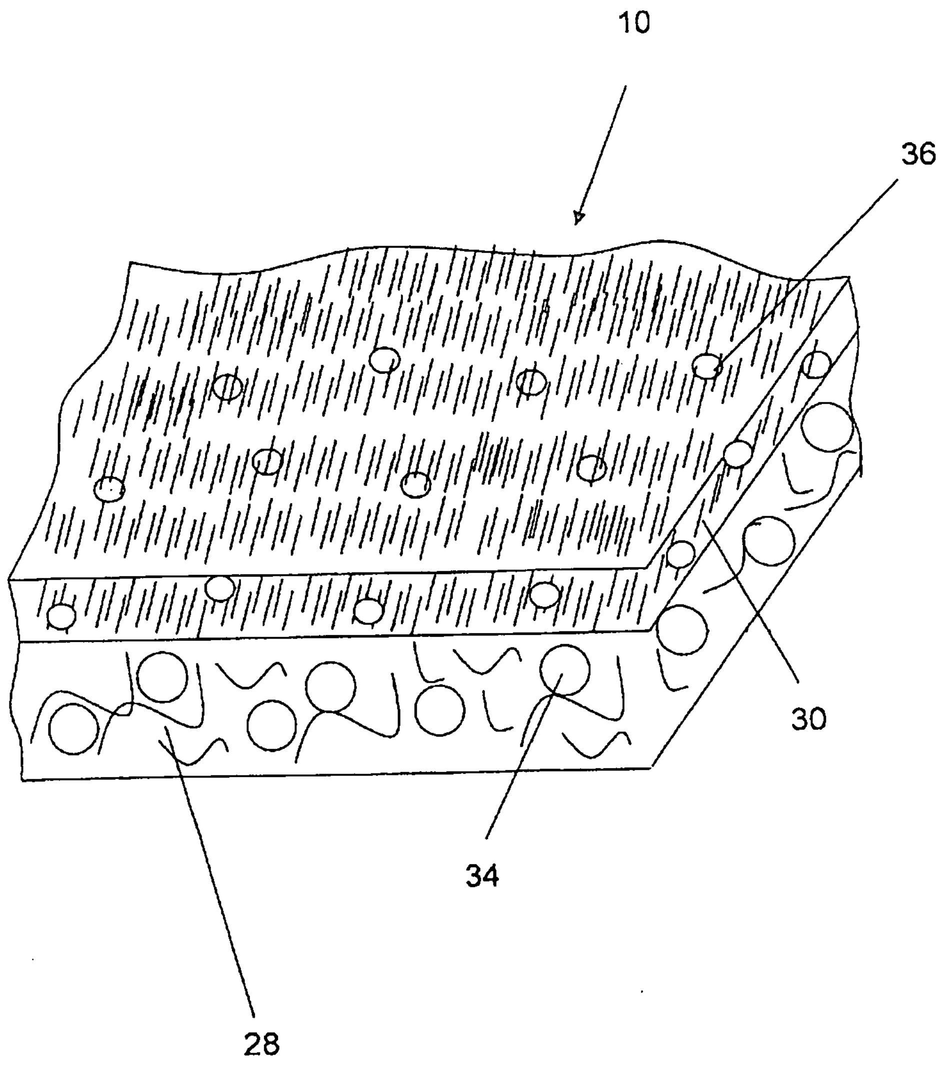
FIG. 3 shows a further perspective cutaway view of the embodiment of the run-in coating in accordance with the invention with a micro-profile from FIG. 2.

In FIG. 3 the running-in coating from FIG. 2 is shown once more, however without the profile 32. In this view, the structure of the main running-in layer 30 can be seen. In the embodiment shown, it consists of aligned fibers with unhardened spheres 36 contained and distributed therein.

What is claimed is:

1. A running-in coating of a gas turbine engine, comprising:

a first dimensionally stable layer and a second running-in layer applied to a housing of a compressor of the gas turbine engine;

wherein the first dimensionally stable layer has a profile and wherein the profile extends above a surface of the first dimensionally stable layer;

wherein the second running-in layer completely surrounds the first dimensionally stable layer and the profile such that a portion of the second running-in layer that surrounds the profile also extends above the surface of the first dimensionally stable layer;

wherein the profile forms a groove in the running-in coating;

and wherein a depth of the groove is larger than a width of the groove.

2. The running-in coating according to claim 1, wherein the second running-in layer has a uniform thickness.

3. The running-in coating according to claim 1, wherein the second running-in layer has micro-profiling on at least a side facing away from the first layer.

4. The running-in coating according to claim 1, wherein the second running-in layer consists of a material with run-in capability or is coated with a material with run-in capability.

5. The running-in coating according to claim 1, wherein the second running-in layer consists of a fibrous or porous material.

6. The running-in coating according to claim 1, wherein the first dimensionally stable layer consists of a fibrous, a porous or a solid material.

7. The running-in coating according to claim 1, wherein the second running-in layer consists of a fibrous material with aligned fibers.

8. The running-in coating according to claim 1, wherein the first dimensionally stable and/or the second running-in layer is provided with reinforcement means.

9. A compressor for a gas turbine engine, comprising:

a housing; and a running-in coating applied to the housing;

wherein the running-in coating includes a first dimensionally stable layer and a second running-in layer;

wherein the first dimensionally stable layer has a profile and wherein the profile extends above a surface of the first dimensionally stable layer;

wherein the second running-in layer completely surrounds the first dimensionally stable layer and the profile such that a portion of the second running-in layer that surrounds the profile also extends above the surface of the first dimensionally stable layer;

wherein the profile forms a groove in the running-in coating;

and wherein a depth of the groove is larger than a width of the groove.

10. A method of coating a housing of a compressor of a gas turbine engine, comprising the steps of:

applying a first dimensionally stable layer and a second running-in layer to the housing, wherein the first dimensionally stable layer has a profile, wherein the profile extends above a surface of the first dimensionally stable layer, and wherein the second running-in layer completely surrounds the first dimensionally stable layer and the profile such that a portion of the second running-in layer that surrounds the profile also extends above the surface of the first dimensionally stable layer;

wherein the profile forms a groove in the running-in coating;

and wherein a depth of the groove is larger than a width of the groove.

* * * * *